J. FOSTER.
Side-Spring for Vehicles.

No. 204,553. Patented June 4, 1878.

Witnesses:
W. C. McArthur.
C. L. Evert.

Inventor:
John Foster,
per T. H. Alexander & Elliott
Attorneys

UNITED STATES PATENT OFFICE.

JOHN FOSTER, OF YPSILANTI, MICHIGAN.

IMPROVEMENT IN SIDE SPRINGS FOR VEHICLES.

Specification forming part of Letters Patent No. 204,553, dated June 4, 1878; application filed November 7, 1877.

*To all whom it may concern:*

Be it known that I, JOHN FOSTER, of Ypsilanti, in the county of Washtenaw and State of Michigan, have invented certain new and useful Improvements in Side-Bar Wagon-Springs; and I do hereby declare that the following is a full, clear, and exact description thereof, reference being had to the accompanying drawings, and to the letters of reference marked thereon, which forms part of this specification.

The nature of my invention consists in the construction and arrangement of the springs, side bars, and connections of a side-bar vehicle, as will be hereinafter more fully set forth.

In order to enable others skilled in the art to which my invention appertains to make and use the same, I will now proceed to describe its construction and operation, referring to the annexed drawing, in which—

Figure 1:
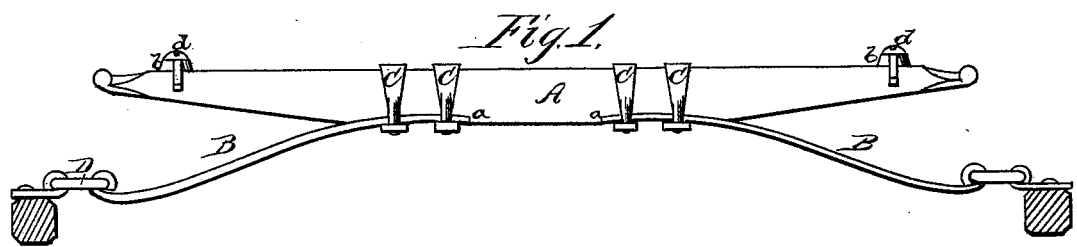
Figure 2:
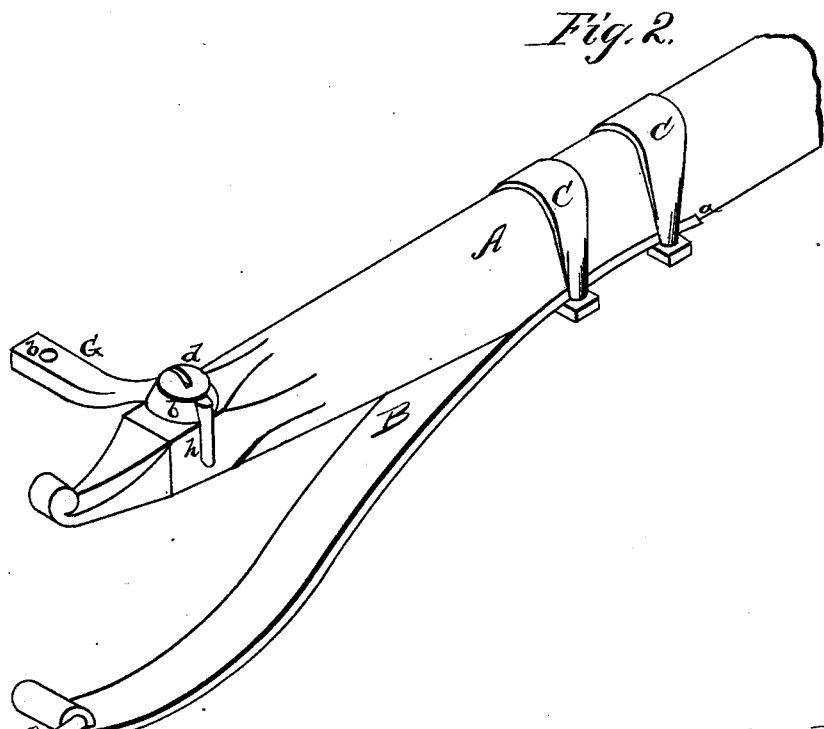

Figure 1 is a side view of one of my side bars with springs attached, and Fig. 2 a detail perspective view.

A represents the side bar of the vehicle, which is supported upon two short springs, B B, instead of one continuous spring, as ordinarily made.

The inner ends of the springs B B butt against shoulders $a$ $a$ formed in the under side of the bar A, and the springs are fastened to said bar by means of ordinary clips C C. The springs B may be made of as many leaves as desired.

The outer ends of the springs B are, by links D, connected to suitable clips passing around the hind axle and front head-block. The various parts are of such dimensions and so arranged that the ends of the bar A will be over the outer ends of the springs.

The body of the vehicle is supported upon the ends of the bar A, instead of in the center, and it is connected to the bars by means of irons G, which are to be firmly fastened to the body or box. The outer ends of the irons form rounded flat parts $b$, to lie on the bar A, and through which are passed screws $d$, for securing them to said bar, and lips or short arms $h$ project downward from the outer end of each iron, to lie against the outer side of the bar to strengthen the parts and keep them together. By the box resting on the ends of the bar it brings the weight at the four corners of the box, thus also allowing the body to be dropped down farther than it otherwise would go.

The bars A being long, as described, equalize the load by throwing it on the four corners and on the ends of the springs. It also prevents the rocking side motion observable in a continuous spring or in a side spring with short bar.

I am aware that a side bar for vehicles composed of a short stiff center portion with spring ends is not new, and I do not claim such as my invention.

Having thus fully described my invention, what I claim as new, and desire to secure by Letters Patent, is—

The combination of the elongated side bar A, having shoulders or offsets $a$ $a$ formed on its under side at equal distances from the center, the short springs B B, butting against the shoulders $a$ and secured to the side bar by clips C, and the links D, forming the connection between the outer ends of the springs and the hind axle and front head-block, and the irons G, secured to the ends of the elongated side bars A, all constructed substantially as and for the purposes herein set forth.

In testimony that I claim the foregoing as my own I affix my signature in presence of two witnesses.

JOHN FOSTER.

Witnesses:
EDWARD P. ALLEN,
FRED. O. HUNT.